(12) United States Patent
Wu et al.

(10) Patent No.: US 12,535,078 B2
(45) Date of Patent: Jan. 27, 2026

(54) FAN DEVICE

(71) Applicant: DELTA ELECTRONICS, INC., Taoyuan (TW)

(72) Inventors: Chih-Hui Wu, Taoyuan (TW); Guan-Chen Liu, Taoyuan (TW); Po-Hui Shen, Taoyuan (TW); Chia-Huang Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/818,957

(22) Filed: Aug. 29, 2024

(65) Prior Publication Data

US 2025/0369448 A1    Dec. 4, 2025

(30) Foreign Application Priority Data

May 29, 2024   (CN) .......................... 202410677015.5

(51) Int. Cl.
| | |
|---|---|
| *F04D 25/06* | (2006.01) |
| *F04D 19/00* | (2006.01) |
| *F04D 29/52* | (2006.01) |

(52) U.S. Cl.
CPC ......... *F04D 25/068* (2013.01); *F04D 19/002* (2013.01); *F04D 29/522* (2013.01)

(58) Field of Classification Search
None
See application file for complete search history.

(56) References Cited

U.S. PATENT DOCUMENTS

| | | | | |
|---|---|---|---|---|
| 8,303,274 B2 * | 11/2012 | Winkler | ................. | H02K 11/33 |
| | | | | 417/423.1 |
| 2009/0155097 A1 * | 6/2009 | Winkler | ............... | H02K 5/1675 |
| | | | | 417/354 |

FOREIGN PATENT DOCUMENTS

| | | | | |
|---|---|---|---|---|
| CN | 104421174 B | | 7/2017 | |
| TW | I314433 B | * | 9/2009 | ......... H05K 7/20172 |
| TW | I373903 B | | 10/2012 | |

OTHER PUBLICATIONS

Huang—CN 114992153 A + machine translation (Year: 2022).*

* cited by examiner

*Primary Examiner* — Juan G Flores
(74) *Attorney, Agent, or Firm* — CKC & Partners Co., LLC (57) ABSTRACT

A fan device includes a motor set, an impeller, a frame, and a circuit board. The impeller is rotatably connected to one end of the motor set. The frame is disposed at another end of the motor set. The frame includes a wall portion. The wall portion surrounds to form an accommodating groove. The wall portion has a through hole. The circuit board is accommodated in the accommodating groove.

3 Claims, 8 Drawing Sheets

FAN DEVICE

CROSS-REFERENCE TO RELATED APPLICATION

This application claims priority to China Application Serial Number 202410677015.5, filed May 29, 2024, which is herein incorporated by reference.

BACKGROUND

Technical Field

The present disclosure relates to a fan device.

Description of Related Art

There is a conventional inner-rotor fan device in which the magnetic ring is fixed on the impeller. However, there is no space between the impeller and the winding set of the stator for airflow to dissipate heat, thus affecting the operational stability of the fan device.

There is also a conventional inner-rotor fan device in which the impeller and the central shaft of the motor set adopt assembly fit (sliding fit), and a buckle is used to fix the axial position of the impeller to achieve the assembly effect. This makes the fan device unable to meet the stability requirements at high rotational speeds.

There is also a conventional fan device that includes two printed circuit boards, and additional fasteners must be used to match the holes or notches on the printed circuit boards in order to achieve the assembly effect. This not only requires additional assembly man-hours, but also fails to meet the needs of automated assembly.

Accordingly, how to provide a fan device to solve the aforementioned problems becomes an important issue to be solved by those in the industry.

SUMMARY

An aspect of the disclosure is to provide a fan device that can efficiently solve the aforementioned problems.

According to an embodiment of the disclosure, a fan device includes a motor set, an impeller, a frame, and a circuit board. The impeller is rotatably connected to one end of the motor set. The frame is disposed at another end of the motor set. The frame includes a wall portion. The wall portion surrounds to form an accommodating groove. The wall portion has a through hole. The circuit board is accommodated in the accommodating groove.

According to an embodiment of the disclosure, the accommodating groove has an opening. The opening is located on a side of the wall portion away from the motor set. The fan device further includes a cover. The cover covers the opening and is engaged with the through hole.

According to an embodiment of the disclosure, the cover includes a base plate and an engaging member. The base plate covers the opening. The engaging member is connected to the base plate. The engaging member extends in the accommodating groove. The engaging member is engaged with an inner edge of the through hole.

According to an embodiment of the disclosure, an edge of the base plate has a recessed groove. The engaging member is partially located in the recessed groove.

According to an embodiment of the disclosure, the engaging member includes a first extending portion, a second extending portion, and a hook. The first extending portion is located in the recessed groove and connected to the base plate. The second extending portion is connected to the first extending portion and extends away from the base plate. The hook is connected to the second extending portion and engaged with the inner edge of the through hole.

According to an embodiment of the disclosure, the fan device further includes a rotating shaft. The impeller is sleeved onto an outer edge of the rotating shaft. The motor set includes a central shaft. The rotating shaft is sleeved onto the central shaft and forms a riveted assembly with the central shaft.

According to an embodiment of the disclosure, the impeller and the rotating shaft form a riveted assembly or an embedded assembly.

According to an embodiment of the disclosure, the fan device further includes an inner housing. The motor set is disposed in the inner housing. The frame is sleeved onto an outer edge of the inner housing and forms an embedded assembly with the inner housing.

According to an embodiment of the disclosure, the impeller has a plurality of heat dissipation holes. The heat dissipation holes communicate an inner side and an outer side of the impeller. The heat dissipation holes are arranged in a ring shape.

According to an embodiment of the disclosure, the impeller further has a plurality of flow guide protrusions. The flow guide protrusions respectively extend above the heat dissipation holes.

According to an embodiment of the disclosure, when viewing the impeller from above, edges of the flow guide protrusions above the heat dissipation holes are perpendicular to a rotation direction of the impeller.

According to an embodiment of the disclosure, a fan device includes a motor set, an impeller, a frame, a first circuit board, and a second circuit board. The impeller is rotatably connected to one end of the motor set. The frame is disposed at another end of the motor set. The frame includes a wall portion. The wall portion surrounds to form an accommodating groove. The first circuit board is accommodated in the accommodating groove. The second circuit board is accommodated in the accommodating groove and electrically connected to the first circuit board. The first circuit board is arranged between the motor set and the second circuit board.

According to an embodiment of the disclosure, the fan device further includes a first pin header buffer and a second pin header buffer. The first pin header buffer is disposed on a side of the first circuit board facing the second circuit board. The second pin header buffer is disposed on a side of the second circuit board facing the first circuit board and coupled to the first pin header buffer.

According to an embodiment of the disclosure, the frame further includes a guide rib. The guide rib is disposed on an inner wall of the wall portion. An edge of the first circuit board and an edge of the second circuit board each have a guide groove engaged with the guide rib.

According to an embodiment of the disclosure, the accommodating groove has an opening. The opening is located on a side of the wall portion away from the motor set. The fan device further includes a cover. The cover covers the opening. The guide rib extends toward the motor set from the opening.

To sum up, in the fan device of the present disclosure, By forming an opening in the wall portion of the frame that forms the accommodating groove, when the fan device operates, the airflow can flow into the accommodating groove through the opening to dissipate heat from the circuit board disposed in the accommodating groove, thereby increasing the operational stability of the fan module. By forming a gap (i.e., the gap between the recessed groove on the edge of the base plate of the cover and the engaging member) on the cover that covers the opening of the accommodating groove, the high-temperature airflow after flowing through the circuit board can flow out of the accommodating groove through the gap to achieve a heat dissipation effect. In addition, the gap can also be used for draining liquid to prevent liquid from accumulating in the accommodating groove and affecting the internal electronic components of the fan device. By making the rotating shaft and the central shaft of the motor set form a riveted assembly, or further making the impeller and the rotating shaft form a riveted assembly or an embedded assembly, the fan device can meet the stability requirements at high speeds. By arranging a plurality of circuit boards sequentially away from the motor set, the lateral footprint of the circuit boards can be reduced, thereby increasing the working area of the impeller. By coupling the circuit boards through the pin header buffers and cooperating with the mutual positioning between the guide ribs on the inner wall of the wall portion and the guide grooves on the edges of the circuit boards, the additional fixing components conventionally required to fix the circuit boards can be omitted, thereby allowing the circuit boards to increase the layout areas for wiring or placing electronic components, or effectively reducing the size of the circuit boards to improve space utilization. In addition, automated assembly of more than two circuit boards can also be achieved.

The above is only used to describe the problems to be solved by the present disclosure, technical solutions to solve the problems and their effects, and so on. Specific details of the present disclosure will be described in the following embodiments with reference to relevant drawings.

BRIEF DESCRIPTION OF THE DRAWINGS

In order to make the above and other purposes, features, advantages, and embodiments of the present disclosure easier to understand, the accompanying drawings are provided and described as follows.

DETAILED DESCRIPTION

A plurality of embodiments of the present disclosure will be described below with reference to the accompanying drawings. For the sake of clarity, many practical details will be described together in the following description. However, it should be understood that these practical details should not be used to limit the present disclosure. That is to say, in some embodiments of the present disclosure, these practical details are not necessary. In addition, for the sake of simplifying the accompanying drawings, some commonly used structures and components are illustrated in the accompanying drawings in a simple schematic manner.

Figure 1:
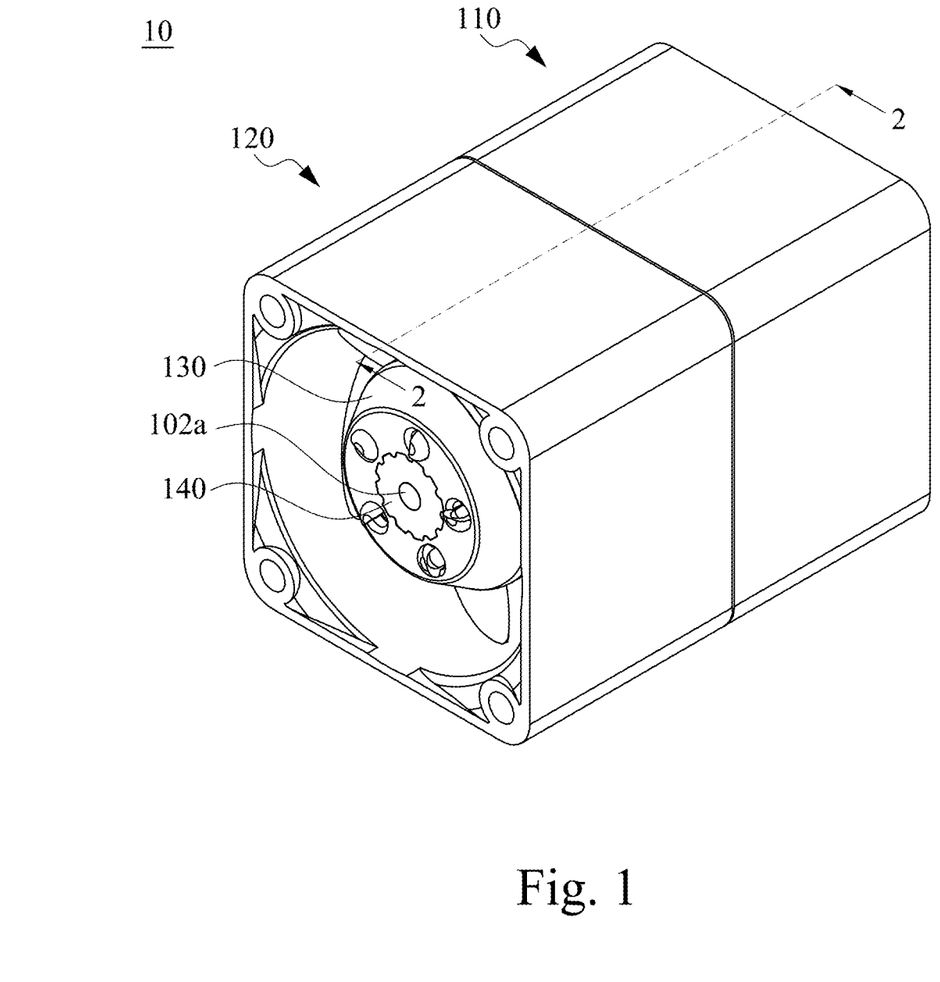
FIG. 1 is a perspective view of a fan device according to an embodiment of the present disclosure.
Figure 2:
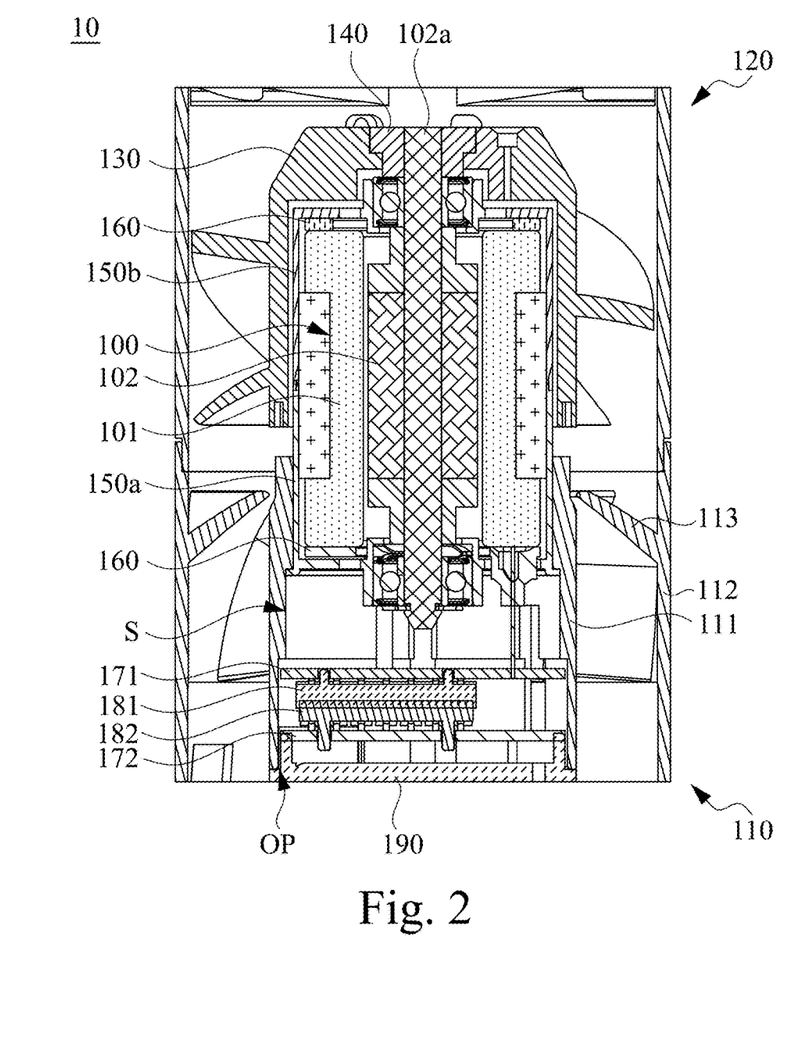
FIG. 2 is a cross-sectional view of the fan device in FIG. 1 taken along line 2-2.

Reference is made to FIGS. 1 and 2. FIG. 1 is a perspective view of a fan device 10 according to an embodiment of the present disclosure. FIG. 2 is a cross-sectional view of the fan device 10 in FIG. 1 taken along line 2-2. As shown in FIGS. 1 and 2, the fan device 10 includes a motor set 100, an impeller 130, and frames 110, 120. The impeller 130 is rotatably connected to one end of the motor set 100. The frame 120 surrounds an outer edge of the impeller 130. The frame 110 is disposed at another end of the motor set 100 and is assembled to the frame 120 to form a complete appearance of the fan device 10.

Specifically, as shown in FIG. 2, the fan device 10 further includes inner housings 150a, 150b. The inner housings 150a, 150b can be assembled in a tight fitting or sliding fitting manner. The inner housings 150a, 150b can form an accommodating space after being assembled. The motor set 100 is disposed in the accommodating space of the inner housings 150a, 150b. The frame 110 is sleeved onto an outer edge of the inner housing 150a, and the impeller 130 surrounds an outer edge of the inner housing 150b. The motor set 100 includes a stator 101 and a mover 102. The stator 101 includes a winding, while the mover 102 includes magnetic elements. The energized winding can drive the magnetic components, causing the mover 102 to rotate relative to the stator 101. In addition, the fan device 10 further includes a rotating shaft 140. The impeller 130 is sleeved onto an outer edge of the rotating shaft 140. The mover 102 of the motor set 100 includes a central shaft 102a. The rotating shaft 140 is sleeved onto the central shaft 102a. Therefore, the rotating central shaft 102a can drive the impeller 130 to rotate through the rotating shaft 140, thereby introducing the air outside the fan device 10 into the fan device 10 through the frame 120, and then exhausting it out of the fan device 10 through the frame 110.

In some embodiments, the frame 110 and the inner housing 150a constitute an embedded assembly. For example, the frame 110 and the inner housing 150a are made of plastic. Therefore, the inner housing 150a can be embedded in the frame 110 using an embedded injection process, so that the two can be firmly fixed. Through this fixing method, the inner housing 150a can simultaneously achieve anti-rotation and axial positioning functions relative to the frame 110.

In some embodiments, the rotating shaft 140 and the central shaft 102a form a riveted assembly. That is to say, the materials of the rotating shaft 140 and the central shaft 102a include metal, and are firmly fixed by riveting. In this way, the stability of the fan device 10 at high rotation speeds can be increased.

In some embodiments, the impeller 130 and the rotating shaft 140 may further form a riveted assembly. That is to say, the impeller 130 is made of metal and is firmly fixed to the rotating shaft 140 by riveting. In other embodiments, the impeller 130 and the rotating shaft 140 may further form an embedded assembly. That is, the material of the impeller 130 includes plastic. Therefore, the rotating shaft 140 can be embedded in the impeller 130 using an embedded injection process, so that the two can be firmly fixed. In this way, the fan device 10 can meet the stability requirements at high rotation speeds.

As shown in FIG. 2, the fan device 10 further includes an insulating member 160. The insulating member 160 is disposed in the inner housings 150a, 150b and located at upper and lower edges of the motor set 100 to prevent the motor set 100 from direct contact with the inner housings 150a, 150b.

Figure 3:
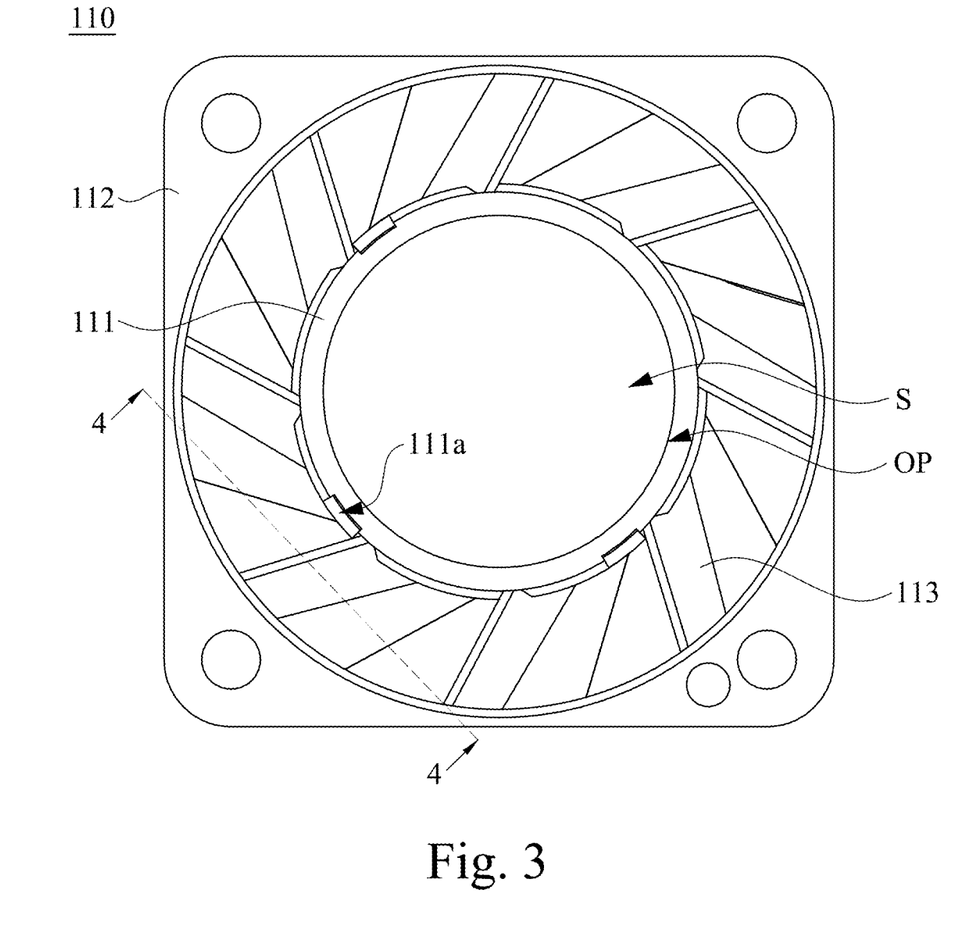
FIG. 3 is a top view of a frame in FIG. 2.
Figure 4:
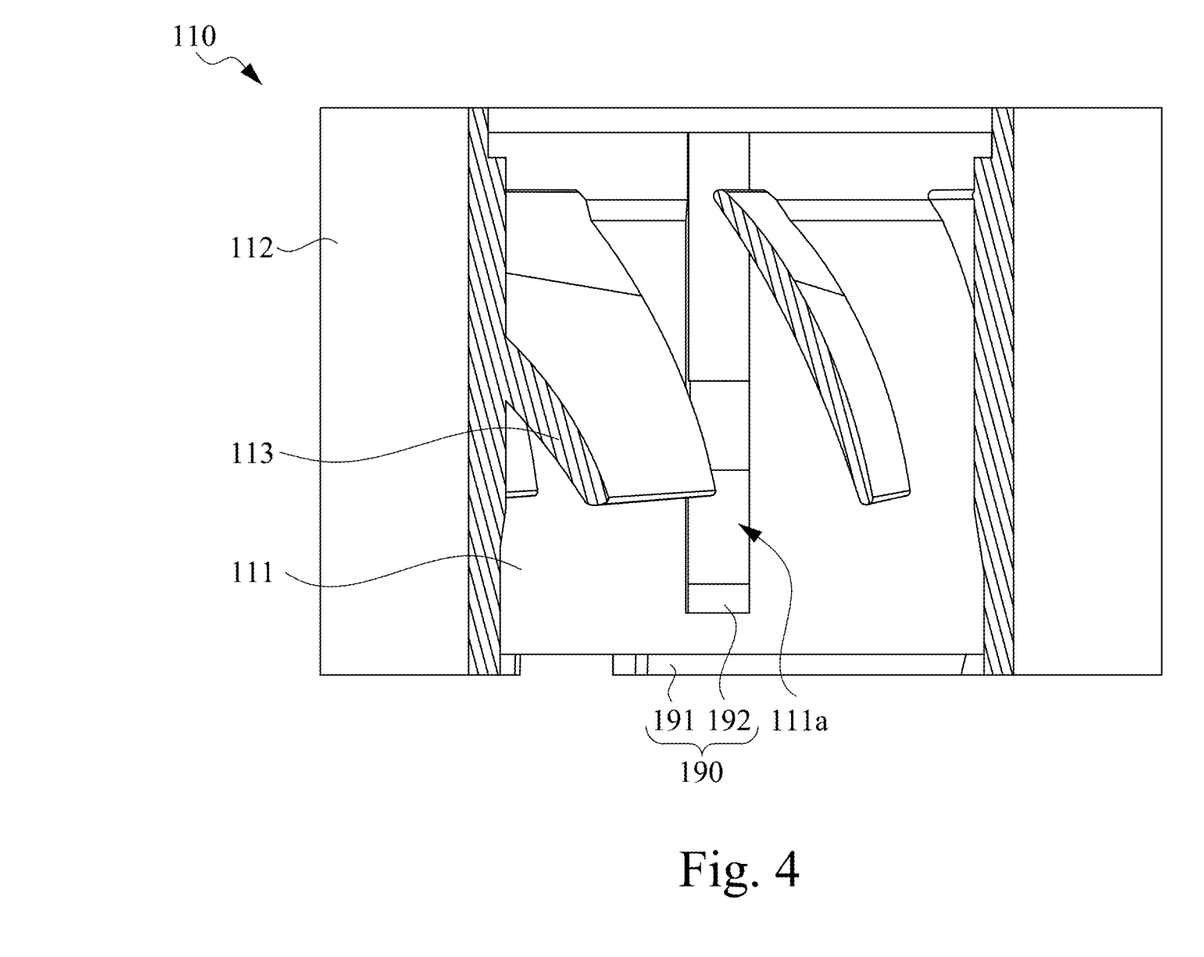
FIG. 4 is a cross-sectional view of the frame and a cover in FIG. 2 taken along line 4-4 in FIG. 3.

Reference is made to FIGS. 3 and 4. FIG. 3 is a top view of the frame 110 in FIG. 2. FIG. 4 is a cross-sectional view of the frame 110 and a cover 190 in FIG. 2 taken along line 4-4 in FIG. 3. As shown in FIGS. 2 to 4, the frame 110 includes wall portions 111, 112 and a plurality of blades 113. The frame 110 is assembled with the frame 120 through the wall portion 112. The wall portion 112 surrounds an outer edge of the wall portion 111. The blades 113 are connected between an inner edge of the wall portion 112 and the outer edge of the wall portion 111 in a quasi-radial arrangement. The frame 110 is connected to the inner housing 150a through the wall portion 111. The wall portion 111 surrounds to form an accommodating groove S. The wall portion 111 has a through hole 111a. The fan device 10 further includes a first circuit board 171 and a second circuit board 172. The first circuit board 171 and the second circuit board 172 are accommodated in the accommodating groove S. By forming the through hole 111a in the wall portion 111 of the frame 110, when the impeller 130 of the fan device 10 operates, the airflow introduced into the frames 110, 120 to flow into the accommodating groove S through the through hole 111a to dissipate heat on the first circuit board 171 and the second circuit board 172, thereby increasing the operational stability of the fan device 10.

As shown in FIGS. 2 and 4, the accommodating groove S has an opening OP. The opening OP is located on a side of the wall portion 111 away from the motor set 100. The fan device 10 further includes the cover 190. The cover 190 covers the opening OP and is engaged with the opening 111a. Specifically, the cover 190 includes a base plate 191 and an engaging member 192. The base plate 191 covers the opening OP. The engaging member 192 is connected to the base plate 191, extends into the accommodating groove S, and is engaged with an inner edge of the through hole 111a. In other words, the through hole 111a used for airflow to enter the accommodating groove S can also be used as a fixing structure for fixing the cover 190. In this way, a number of additional fixing structures for fixing the cover 190 can be reduced.

Figure 5:
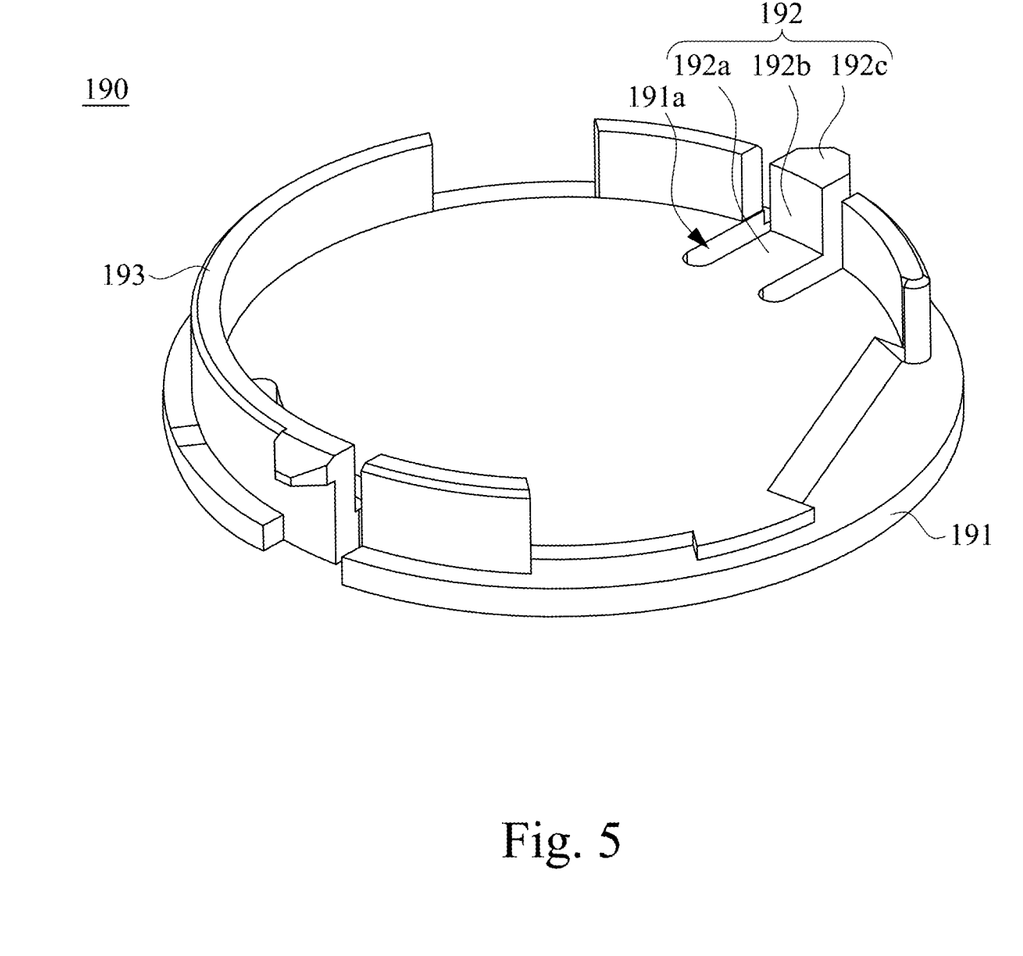
FIG. 5 is a perspective view of the cover in FIG. 2.

Reference is made to FIG. 5. FIG. 5 is a perspective view of the cover 190 in FIG. 2. As shown in FIG. 5, an edge of the base plate 191 of the cover 190 has a recessed groove 191a. The engaging member 192 is partially located in the recessed groove 191a. Specifically, the engaging member 192 includes a first extending portion 192a, a second extending portion 192b, and a hook 192c. The first extending portion 192a is located in the recessed groove 191a on the edge of the base plate 191 and is connected to the base plate 191. For example, the first extending portion 192a is parallel to the base plate 191. The second extending portion 192b is connected to the first extending portion 192a and extends away from the base plate 191. For example, the second extending portion 192b is perpendicular to the base plate 191. The hook 192c is connected to an end of the second extending portion 192b away from the first extending portion 192a, and is engaged with the inner edge of the through hole 111a. By connecting the hook 192c to the base plate 191 sequentially through the second extending portion 192b and the first extending portion 192a, the engaging member 192 can function as an elastic arm, which facilitates the user to engage or disassemble the hook 192c relative to the through hole 111a through the elastic deformation of the engaging member 192.

Through the aforementioned structural configurations, a gap can be formed between the recessed groove 191a on the edge of the base plate 191 and the engaging member 192. The high-temperature airflow after flowing through the first circuit board 171 and the second circuit board 172 can flow out of the accommodating groove S through the gap to achieve a heat dissipation effect. In addition, this gap can also be used for draining liquid to prevent liquid from accumulating in the accommodating groove S and affecting the internal electronic components of the fan device 10.

As shown in FIG. 5, the cover 190 further includes a retaining wall 193. The retaining wall 193 is connected to the base plate 191 and substantially extends along the edge of the base plate 191. The retaining wall 193 and the second extending portion 192b of the engaging member 192 are located on the same side of the base plate 191. For example, the retaining wall 193 is perpendicular to the base plate 191. The retaining wall 193 is configured to be inserted into the accommodating groove S and abut against the inner wall of the wall portion 111 when the base plate 191 covers the opening OP, so as to limit the relative position of the cover 190 and the wall portion 111.

As shown in FIG. 2, the first circuit board 171 is arranged between the motor set 100 and the second circuit board 172. That is to say, the first circuit board 171 and the second circuit board 172 are sequentially arranged away from the motor set 100. In this way, the lateral footprint of the first circuit board 171 and the second circuit board 172 can overlap, thereby increasing the working area of the impeller 130.

As shown in FIG. 2, the fan device 10 further includes a first pin header buffer 181 and a second pin header buffer 182. The first pin header buffer 181 is disposed on a side of the first circuit board 171 facing the second circuit board 172. The second pin header buffer 182 is disposed on a side of the second circuit board 172 facing the first circuit board 171 and is coupled to the first pin header buffer 181. In other words, the first circuit board 171 and the second circuit board 172 are electrically connected through the first pin header buffer 181 and the second pin header buffer 182.

Figure 6:
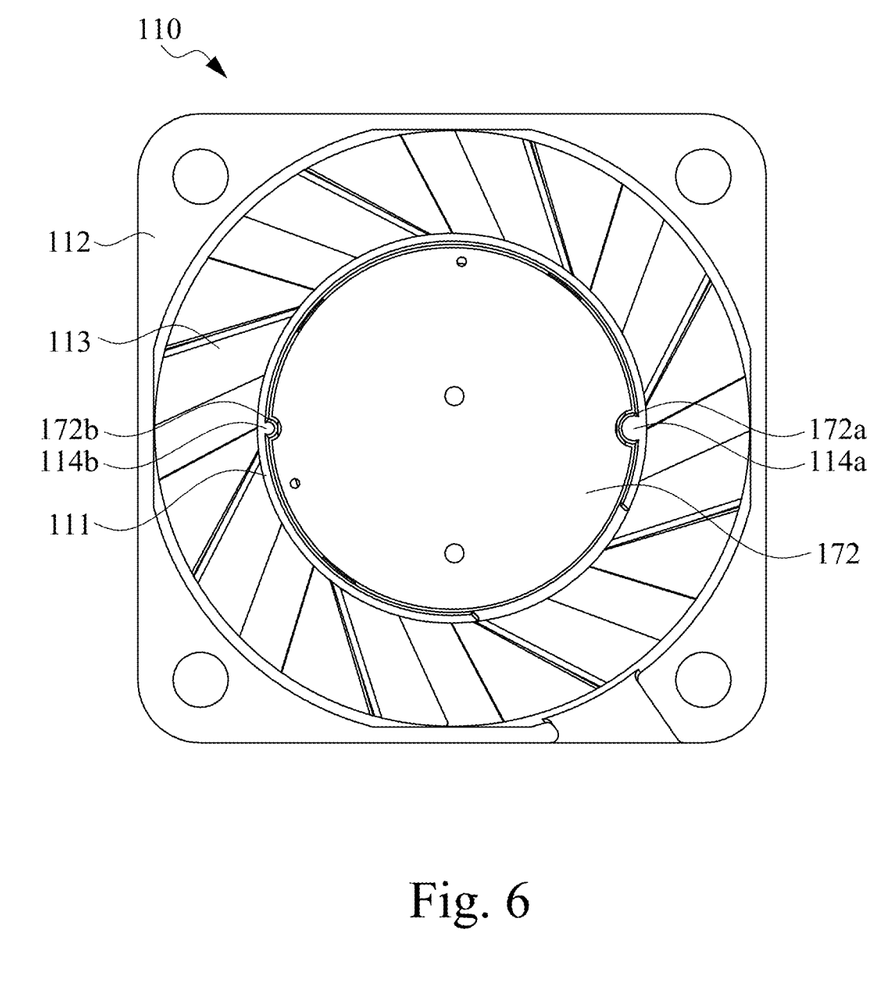
FIG. 6 is a bottom view of the frame and a second circuit board in FIG. 2.

Reference is made to FIG. 6. FIG. 6 is a bottom view of the frame 110 and the second circuit board 172 in FIG. 2. As shown in FIG. 6, the frame 110 further includes guide ribs 114a, 114b. The guide ribs 114a, 114b are disposed on an inner wall of the wall portion 111. In some embodiments, with reference to FIG. 2, the guide ribs 114a, 114b extend toward the motor set 100 from the opening OP of the accommodating groove S. An edge of the second circuit board 172 has guide grooves 172a, 172b. The guide grooves 172a, 172b are respectively engaged with the guide ribs 114a, 114b. Although not shown, an edge of the first circuit board 171 may also have structures similar to the guide grooves 172a, 172b. In this way, the first circuit board 171 and the second circuit board 172 can enter the accommodating groove S through the opening OP of the accommodating groove S, and be installed inside the accommodating groove S along the guide ribs 114a, 114b.

According to the foregoing structural configurations, by coupling the first circuit board 171 and the second circuit board 172 through the first pin header buffer 181 and the second pin header buffer 182 and cooperating with the mutual positioning between the guide ribs 114a, 114b on the inner wall of the wall portion 111 and the guide grooves 172a, 172b on the edges of the first circuit board 171 and the second circuit board 172, the additional fixing components conventionally required to fix the circuit boards can be omitted, and the first circuit board 171 and the second circuit board 172 can additionally increase the layout areas for wiring or placing electronic components, or can effectively reduce the size of the first circuit board 171 and the second circuit board 172 to improve space utilization. In addition, automated assembly of more than two circuit boards can also be achieved.

As shown in FIG. 6, the guide ribs 114a, 114b have different sizes, and the contours of the guide grooves 172a, 172b respectively match the contours of the guide ribs 114a, 114b. In this way, the guide ribs 114a, 114b of different sizes can be used as a foolproof design when the first circuit board 171 and the second circuit board 172 are assembled.

Figure 7:
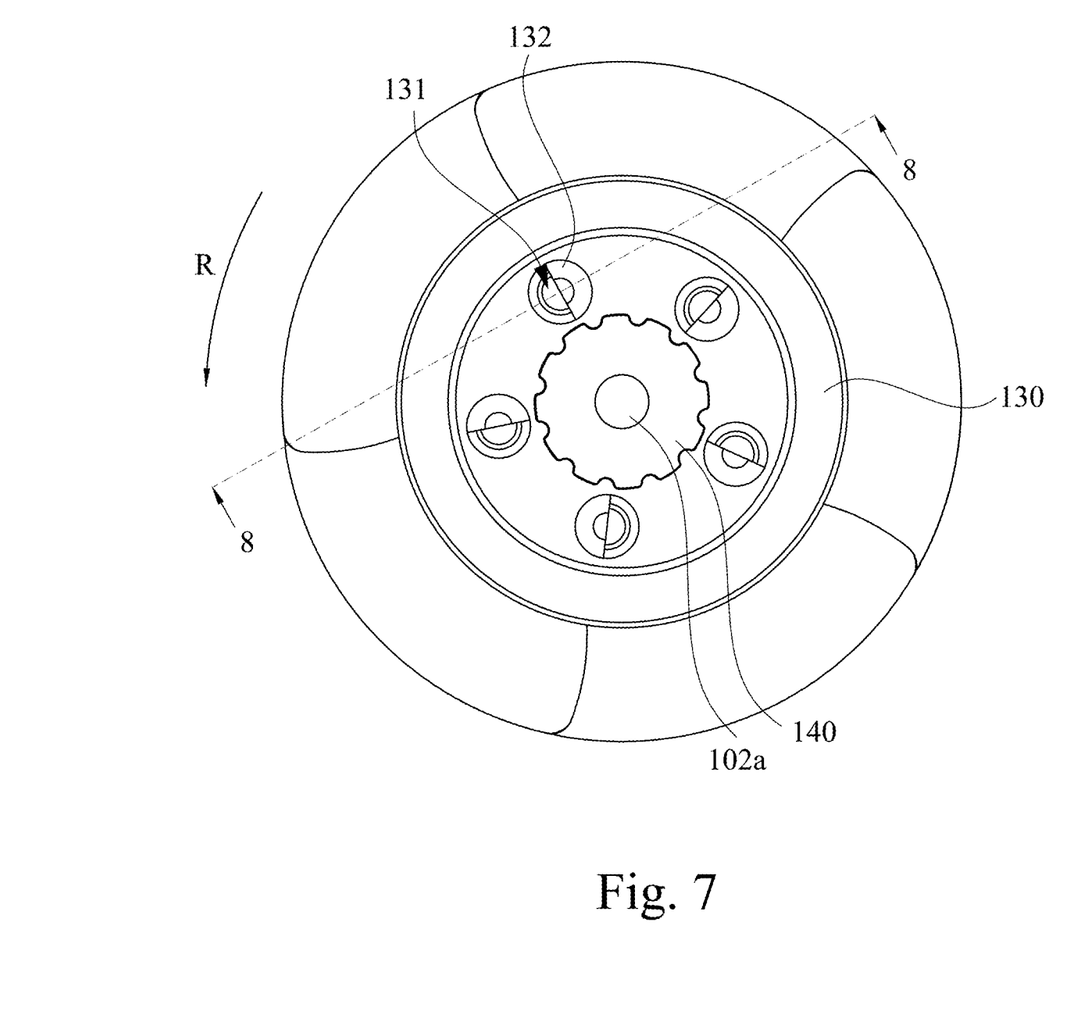
FIG. 7 is a top view of some components of the fan device in FIG. 2.

Reference is made to FIG. 7. FIG. 7 is a top view of some components of the fan device 10 in FIG. 2. As shown in FIG. 7, the impeller 130 has a plurality of heat dissipation holes 131. The heat dissipation holes 131 communicate an inner side and an outer side of the impeller 130. The heat dissipation holes 131 are arranged in a ring shape outside the outer edges of the rotating shaft 140 and the central shaft 102a. The impeller 130 further has a plurality of flow guide protrusions 132. The flow guide protrusions 132 respectively extend above the heat dissipation holes 131.

Figure 8:
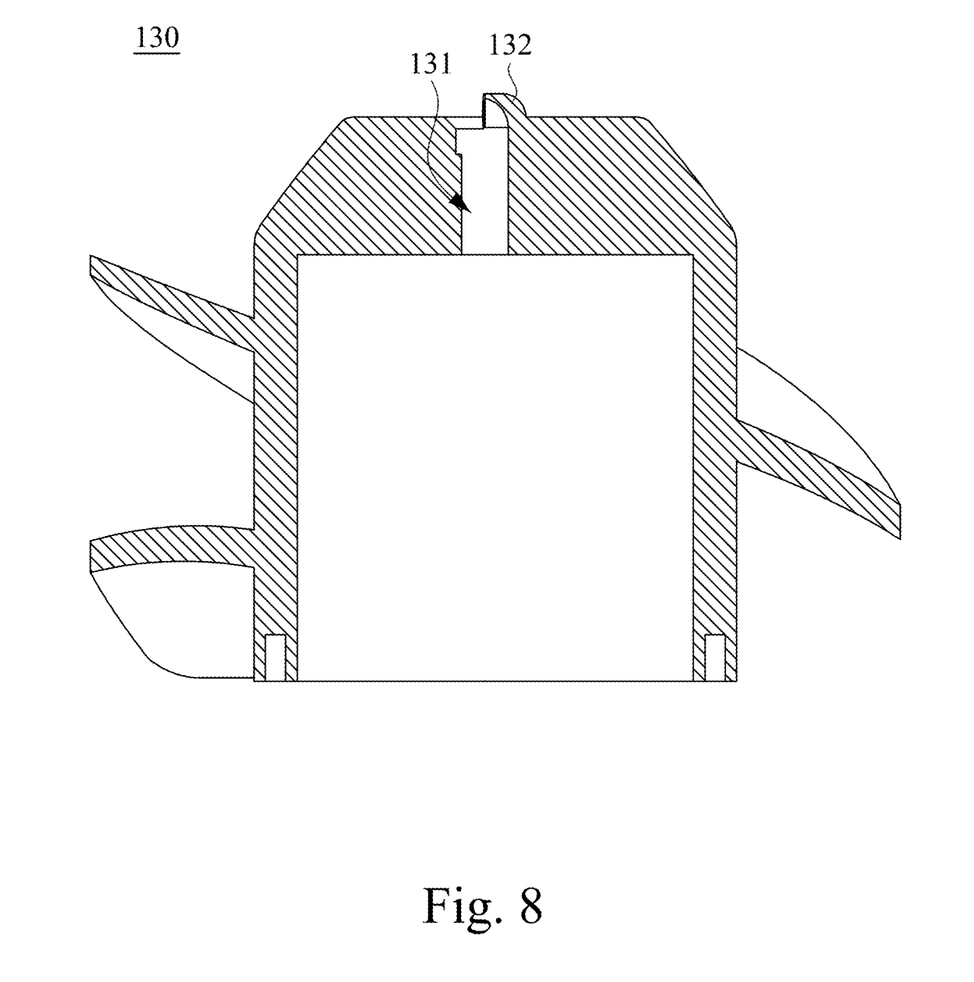
FIG. 8 is a cross-sectional view of an impeller in FIG. 7 taken along line 8-8.

Reference is made to FIG. 8. FIG. 8 is a cross-sectional view of the impeller 130 in FIG. 7 taken along line 8-8. As shown in FIG. 8, the flow guide protrusions 132 has an appearance similar to an air guide hood, which can force the airflow into the heat dissipation holes 131 when the impeller 130 rotates. The airflow entering the inside of the impeller 130 through the heat dissipation holes 131 can help the motor set 100 and the circuits to dissipate heat.

As shown in FIG. 7, when viewing the impeller 130 from above, an outline of the heat dissipation holes 131 blocked by the flow guide protrusions 132 is semicircular, but the present disclosure is not limited thereto. In practical applications, the aforementioned outline may also be in a semi-elliptical or other shape.

As shown in FIG. 7, when viewing the impeller 130 from above, edges of the flow guide protrusions above the heat dissipation holes 131 are perpendicular to a rotation direction R of the impeller 130. In this way, the flow guide protrusions 132 can achieve the best heat dissipation effect.

According to the foregoing recitations of the embodiments of the disclosure, it can be seen that in the fan device of the present disclosure, By forming an opening in the wall portion of the frame that forms the accommodating groove, when the fan device operates, the airflow can flow into the accommodating groove through the opening to dissipate heat from the circuit board disposed in the accommodating groove, thereby increasing the operational stability of the fan module. By forming a gap (i.e., the gap between the recessed groove on the edge of the base plate of the cover and the engaging member) on the cover that covers the opening of the accommodating groove, the high-temperature airflow after flowing through the circuit board can flow out of the accommodating groove through the gap to achieve a heat dissipation effect. In addition, the gap can also be used for draining liquid to prevent liquid from accumulating in the accommodating groove and affecting the internal electronic components of the fan device. By making the rotating shaft and the central shaft of the motor set form a riveted assembly, or further making the impeller and the rotating shaft form a riveted assembly or an embedded assembly, the fan device can meet the stability requirements at high speeds. By arranging a plurality of circuit boards sequentially away from the motor set, the lateral footprint of the circuit boards can be reduced, thereby increasing the working area of the impeller. By coupling the circuit boards through the pin header buffers and cooperating with the mutual positioning between the guide ribs on the inner wall of the wall portion and the guide grooves on the edges of the circuit boards, the additional fixing components conventionally required to fix the circuit boards can be omitted, thereby allowing the circuit boards to increase the layout areas for wiring or placing electronic components, or effectively reducing the size of the circuit boards to improve space utilization. In addition, automated assembly of more than two circuit boards can also be achieved.

Although the present disclosure is disclosed in the above embodiments, the embodiments are not intended to limit the present disclosure. Anyone skilled in the art can make various changes and modifications without departing from the spirit and scope of the present disclosure. Therefore, the protection scope of the present disclosure shall be determined by the appended claims.

What is claimed is:

1. A fan device, comprising:
   a motor set;
   an impeller rotatably connected to one end of the motor set;
   a frame disposed at another end of the motor set, wherein the frame comprises a wall portion, and the wall portion surrounds to form an accommodating groove;
   a first circuit board accommodated in the accommodating groove;
   a second circuit board accommodated in the accommodating groove and electrically connected to the first circuit board, wherein the first circuit board is arranged between the motor set and the second circuit board;
   a first pin header buffer disposed on a side of the first circuit board facing the second circuit board; and
   a second pin header buffer disposed on a side of the second circuit board facing the first circuit board and coupled to the first pin header buffer.

2. The fan device of claim 1, wherein the frame further comprises a guide rib, the guide rib is disposed on an inner wall of the wall portion, and an edge of the first circuit board and an edge of the second circuit board each have a guide groove engaged with the guide rib.

3. The fan device of claim 2, wherein the accommodating groove has an opening, the opening is located on a side of the wall portion away from the motor set, the fan device further comprises a cover, the cover covers the opening, and the guide rib extends toward the motor set from the opening.

* * * * *